No. 665,108. Patented Jan. 1, 1901.
A. KITSON.
VAPOR BURNING APPARATUS.
(Application filed Apr. 24, 1899.)
(No Model.)
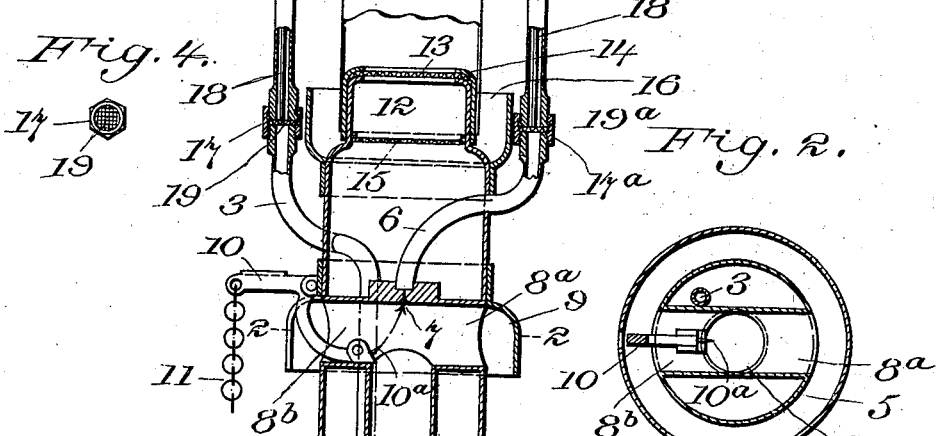

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

VAPOR-BURNING APPARATUS.

SPECIFICATION forming part of Letters Patent No. 665,108, dated January 1, 1901.

Application filed April 24, 1899. Serial No. 714,182. (No model.)

*To all whom it may concern:*

Be it known that I, ARTHUR KITSON, a subject of the Queen of Great Britain, and a resident of Philadelphia, county of Philadelphia, State of Pennsylvania, have invented certain new and useful Improvements in Vapor-Burning Apparatus, of which the following is a specification.

My invention relates to vapor-burning apparatus, and is more specifically designed to produce an improved form of single-burner apparatus for burning the vapor of kerosene or other fluid hydrocarbon mixed with air under the ordinary form of incandescent mantle.

The preferred form of my apparatus is illustrated in the accompanying sheet of drawings, in which—

Figure 1 is an elevation and partial section of my apparatus. Fig. 2 is a cross-section on line 2 2 of Fig. 1. Fig. 3 is a cross-section through the vaporizing-tube, showing the internal filler therefor. Fig. 4 is a cross-section through the oil-supply tube and union, showing the wire-gauze diaphragm located at the junction of the vaporizing-tube with its connecting-tubes.

Throughout the drawings like reference-figures refer to like parts.

The lamp is preferably mounted on a reservoir or bowl (not shown) containing oil and compressed air, it being secured into said bowl by the threaded nipple 1. A valve 2 controls the flow of oil from the bowl through the oil-supply tube 3 to the vaporizing-tube 4, which is preferably made in the shape of a U or horseshoe, so as to extend up alongside of and across the top of the incandescent mantle 20, said incandescent mantle being supported from the vaporizing-tube by the wire 21 or other convenient means. 23 is a short chimney mounted on the upper portion of the vaporizing-tube, and 22 is a drip-valve in the lower part of the burner apparatus. This burner and air-mixing apparatus are all mounted on or within the upright tube 5. The vapor is carried from the end of the vaporizing-tube by the vapor-discharge tube 6 into the tube 5 and discharged through the outwardly-flaring opening 7 into the upper end of the mixing-tube 8. This mixing-tube is of less diameter and length than the upright tube 5 and is located, preferably, concentric therewith. Air-conduits $8^a$ $8^b$ extend in through the walls of the upright tube 5 and lead to the upper end of the mixing-tube 8. A bell-shaped muffler 9 overhangs the openings to these air-conduits, and on said muffler or on other pivotal bearing supported by the upright tube 5 is pivoted the vibrating arm 10, which carries the needle $10^a$ at its inner end, adapted to enter the discharge-opening 7 for cleaning the same of accumulated material whenever the arm 10 is vibrated by pulling on the chain 11, connected to its outer end.

12 represents the burner proper, which is formed by contracting the upper end of the main tube 5 or by inserting a thimble therein. The gauze 13 is placed over the burner-opening and held in place by the annular cap 14. A second lower gauze 15 may be inserted in the burner. A metal collar 16 is placed on the upper end of the tube 5 and surrounds the burner 12, leaving an annular space between the two. This collar, as shown, is in metallic contact with the tube 5, and the particular construction shown might be varied, so long as any construction was employed which gave free conduction of heat from the collar 16 to the body of the tube 5.

The U-shaped vaporizing-tube 4 is connected to the oil-supply tube 3 and the vapor-discharge tube 6, which are located on opposite sides of the burner, by means of the unions 17 $17^a$, and between the abutting ends of the tubes I preferably introduce gauze diaphragms 19 $19^a$, as shown. In the vaporizing-tube is a U-shaped rod or wire 18, which is preferably supported in position by the wire-gauze diaphragms.

The method of operating my invention is as follows: The vaporizing-tube 4 being heated by a gasolene-torch or any other convenient means of preheating, (not shown,) the valve 2 is opened and the oil is forced up through the supply-pipe 3 and gauze diaphragm 19 into the vaporizing-tube 4. As it passes up and over the mantle through this vaporizing-tube it is compelled by the internal filler 18 to pass along the surface of the tube in a comparatively thin layer or film and is thus brought in thorough contact with the hot tube. By the time it has approached the union 17ª it is in the form of vapor, which passes through the diaphragm 19ª, through the vapor-discharge tube 6, and out at the discharge-opening 7 in the form of a jet. This jet passes down the mixing-tube 8, drawing in the necessary quantity of air through the air-conduits 8ª 8ᵇ. The noise of the jet is partly muffled and suppressed by the muffler 9. The mixture of air and vapor passing out of the lower end of the mixing-tube 8 strikes the closed lower end of the upright tube 5 and is then compelled to change its direction and pass up through said tube 5 to the burner 12, where it is burned under the mantle 20, giving off heat sufficient to maintain the vaporizing-tube 4 at the necessary temperature.

By pulling on the chain 11 the needle 10ª can be projected up into the opening 7 when the same has become clogged by the accumulation of carbon, cleanses the opening, and enables the lamp to continue in operation. The radiated heat of the burner and mantle strikes the vertical portions of the U-shaped vaporizing-tube 4, and the upward-flowing current of hot gases is concentrated on the upper portion of the tube by the chimney 23.

The advantages of my invention consist in its simple and compact form and in the fact that the mixing operation is all done within the short tube 5, which is kept hot by the fact of its metallic connection with the burner 12 and the surrounding collar 16. The lower skirts of the mantle 20 are of course kept hot by conduction from the upper portions, which are in the immediate vicinity of the flame, and heat radiated from this lower skirt of the mantle is intercepted by the metallic collar 16. The oil-supply tube is also carried up through this upright tube 5 and bathed in the current of hot vapor and air within the same.

It is evident, of course, that various changes could be made in the details of construction illustrated without departing from the spirit and scope of my invention so long as the relative arrangement of parts shown in the drawings or the principle of operation set out in the specification is preserved.

The particular form, construction, and relation of, for example, the burner and mantle, the vapor-discharge opening, the needling device, &c., herein shown and described are not specifically claimed, as the same constitute the subject-matter of other applications now pending.

Having therefore described my invention, what I claim as new, and desire to protect by Letters Patent, is—

1. In a vapor-burning apparatus the combination of the burner, the incandescent mantle, the U-shaped vaporizing-tube extending up alongside of and over the mantle, and the filler for said tube composed of a solid U-shaped wire of slightly less diameter than the internal diameter of the vaporizing-tube, together with the gauze diaphragms at each end of the filler upon which the ends of the U-shaped filler rest, whereby said filler is supported out of contact with the inner and under portions of the vaporizing-tube.

2. In a vapor-burning apparatus the combination of the burner, the oil-supply tube, and vapor-discharge tube located within the burner-tube but having their outlet and inlet ends respectively projecting from the opposite sides of the burner, and the U-shaped vaporizing-tube having its ends connected thereto by suitable unions.

3. In a vapor-burning apparatus the combination of the burner, the oil-supply tube and vapor-discharge tube located within the burner-tube but having their outlet and inlet ends respectively projecting from the opposite sides of the burner, and the U-shaped vaporizing-tube having its ends connected thereto by suitable unions provided with gauze diaphragms which lie between the abutting ends of said tubes.

4. In a vapor-burning apparatus the combination of the burner, the oil-supply tube, and vapor-discharge tube having their outlet and inlet ends respectively projecting from the opposite sides of the burner, and the U-shaped vaporizing-tube having its ends connected thereto by suitable unions, together with the solid U-shaped filler and the gauze diaphragms carried by the unions so as to lie between the abutting ends of said tubes as a support for the U-shaped filler.

5. In a vapor-burning apparatus the combination of the upright tube adapted to be screwed into the top of an oil-reservoir, but closed at its lower end by a valve, the burner on the upper end of the upright tube, the mixing-tube of less length and diameter than the upright tube, and located within the same, the vaporizing-tube located within the heating zone of the burner and discharging into the upper end of the mixing-tube, said vaporizing-tube connecting with and having its supply controlled by the valve of the upright tube, and the air-conduits through the walls of the upright tube leading to the upper end of the mixing-tube.

6. In a vapor-burning apparatus the combination of the upright tube adapted to be screwed into the top of an oil-reservoir but closed at its lower end, the burner on the upper end of the upright tube, the mixing-tube of less length and diameter than the upright tube and located within the same and provided with a vapor-discharge orifice, the vaporizing-tube located within the heating zone of the burner and connecting with the orifice of the mixing-tube, and the air-conduits through the walls of the upright tube leading to the upper end of the mixing-tube, together with the needle hole-cleaner pivoted to the upright tube and extending in through the air-conduit.

7. In a vapor-burning apparatus the combination of the upright tube adapted to be screwed into the top of an oil-reservoir but closed at its lower end by a valve, the burner on the upper end of the upright tube, the mixing-tube of less length and diameter than the upright tube and located within the same, the vaporizing-tube having its supply controlled by the valve of the upright tube and located within the heating zone of the burner and discharging into the upper end of the mixing-tube, and the air-conduits through the walls of the upright tube leading to the upper end of the mixing-tube, together with the bell-shaped muffler overhanging the mouths of said air-conduits.

8. In a vapor-burning apparatus the combination of the upright tube adapted to be screwed into the top of an oil-reservoir but closed at its lower end by a valve, the burner on the upper end of the upright tube, the mixing-tube of less length and diameter than the upright tube and located within the same, the vaporizing-tube located within the heating zone of the burner and discharging into the upper end of the mixing-tube, and the air-conduits through the walls of the upright tube leading to the upper end of the mixing-tube, together with the oil-supply pipe controlled by the valve of the upright tube, and passing up through the interior of the upright tube, to the vaporizing-tube.

Signed by me at New York city, New York, this 22d day of April, 1899.

ARTHUR KITSON.

Witnesses:
  LILIAN FOSTER,
  W. H. PUMPHREY.